United States Patent [19]
Blachere et al.

[11] 3,714,445
[45] Jan. 30, 1973

[54] APPARATUS FOR OPTICAL MEASUREMENTS OF MICROBIAL CULTURES

[75] Inventors: Henri T. Blachere, Paris; Guy Georges Jamart, Saint-Denis, both of France

[73] Assignees: Institut National de la Recherche Agrenomique, Paris; Etablissements Gourdon, Maisons-Laffitte, France

[22] Filed: Nov. 9, 1970

[21] Appl. No.: 87,638

[30] Foreign Application Priority Data

Nov. 6, 1969 France..................................6938124
Oct. 19, 1970 Germany....................P 20 51 189.1

[52] U.S. Cl. ...................250/218, 356/246, 195/142
[51] Int. Cl. ..............................................G01n 21/26
[58] Field of Search ...250/218, 229; 195/103.5, 142; 356/246, 181, 208

[56] References Cited

UNITED STATES PATENTS

| | | | |
|---|---|---|---|
| 2,898,802 | 8/1959 | Ljungberg et al.................250/229 X |
| 1,937,722 | 12/1933 | Simon et al........................250/218 X |
| 3,542,649 | 11/1970 | Searcy..........................195/103.5 R |
| 3,572,952 | 3/1971 | Anthon..............................356/246 |

*Primary Examiner*—Walter Stolwein
*Attorney*—Otto John Munz

[57] ABSTRACT

A combined sampling and measuring apparatus for optical density measurements of the growth of microbial cultures in large capacity vessel, said apparatus comprising a cylindrical vertical transparent tube mounted in shunt with a closed circuit tubular system in which circulates a fraction of the microbial culture from the vessel, a piston able to slide in the transparent tube, a toric seal on the piston performing the additional function of cleaning the inner wall of the transparent tube when the piston is moved up and down in the transparent tube, a light source and a photo-cell in diametrical opposition; the piston has a diametrical port from side to side to allow the light beam from the source to get the photo-cell when the piston is between the source and the cell, and the piston is provided with means in order that the axis of the port be maintained parallel to the path of the light rays.

The whole is completed by a control block performing a succession of operations including: cleaning of the transparent tube, optical calibration, filling of the tube, and optical density measurement of the culture.

6 Claims, 5 Drawing Figures

APPARATUS FOR OPTICAL MEASUREMENTS OF MICROBIAL CULTURES

BACKGROUND OF THE INVENTION

1. Field of the Invention

The present invention is related to the recording, by means of optical density measurements, of the growth of microbial cultures, especially in large capacity vessels.

2. Description of the Prior Art

It is heretofore known how to sense and record the progress of these cultures in test tubes by measuring their optical density by means of a measuring cell incorporating a light source and a photo-electric receiver on which the light coming from the source falls after having gone through the culture on a certain path.

In order that the measurements be made under good conditions, it is necessary to overcome certain difficulties such as those resulting from the sticking of the culture on the walls of the test tube ; this is done by making use of a scraper or of a mechanical stirrer, as is already known.

In the case of watching the growth of a culture in an appreciably larger vessel than a test tube, or in a vat for industrial use, the method at present in use, according to the knowledge of the Applicants, consists in taking culture samples, putting them into the test tube of a measuring cell and there making an optical density reading, after which the sample is discarded or sent back into the vessel or vat.

This method is not easy to carry out and has drawbacks. Firstly, the conditions of asepsia during a transfer are always precarious, and the handling of cultures can have dangers for the operator ; on the other hand this sort of transfer nearly always produces air bubbles whose presence falsifies the measurements ; the handling of the samples takes a long time, whence it results that the rate of readings is restricted. Lastly, the permanent presence of an operator night and day, in order to watch a fermentation during a week or more, is very onerous.

SUMMARY OF THE INVENTION

The object of the invention is a measuring block which fulfils the following conditions :

to enable optical density to be measured in a semicontinuous way in a large volume culture.

to operate under conditions of asepsia.

to be freed from errors resulting from deposits.

to be freed from errors resulting from air bubbles.

to provide the checking by calibration measurement of the operation of the whole of the measuring block under standard conditions and the practicability of this operation.

to allow measurements at high optical density.

One feature of the invention is to operate measurements on samples taken in the vat and then put back into the vat while observing aseptic conditions, and to that end the invention provides a closed aseptic system, closed by the vat, means for forcing the microbial culture circulate in the system, and means for operating density measurements on one section of this system ; in practice, it is not possible to take accurate density measurements in the system itself, because of deposits which are always produced on the walls and because of air bubbles ; as far as the deposits on the walls are concerned, the classic methods used for dealing with them in the test tubes cannot be put into operation, since the system is closed.

Also, the invention provides a sampling apparatus which is mounted in shunt with the system in order to take a culture sample in the said system and to send it into the test tube of a measuring cell where a reading of optical density is made, after which the sample is sent back into the system, these operations being done under the same aseptic conditions as in the system itself ; the sampling apparatus and the cell have a construction such that the cleaning of the cell walls is ensured and that there is no risk of air bubbles falsifying the measurement.

Another feature of the invention is to provide an apparatus in which each measurement on a sample taken in the vat is immediately preceded or followed by a calibration measurement independent of the microbial culture of the sample, all other things being the same.

Still, another feature of the invention is to provide an apparatus having a maximum of sterilizable parts, viz autoclavable. Accordingly, an apparatus according to the invention is made up of a main body having various elements integral with it, the whole being autoclavable, and of a densitometric apparatus, by nature non-sterilizable, consisting of two elements (a transmitter and a receiver or light detector) which can easily be detached from the main body when the latter is to be autoclaved.

According to a preferred embodiment, the sampling apparatus is essentially made up of a cylindrical test tube mounted in shunt with the closed circuit system, by a piston able to slide in the test tube, and by means for moving the piston in the test tube ; the sealing between the piston and the test tube is obtained by a toric seal with the further function of cleaning the inner wall of the test tube while moving ; the test tube in which the piston can slide is that of a measuring cell which contains, in know manner, a light source and a receiver or photoelectric cell or detector. The piston has a diametrical port crossing it from side to side in order to allow the light beam coming from the source to get to the detector when the said piston occupies a position situated between the source and the detector. In addition, in order that the axis of the said port shall always be parallel to the path of the light rays, the said piston is provided with means for preventing any rotational movement about its axis.

The test tube in which the said piston can slide is vertical and it is connected to the closed circuit system by its upper end ; this latter is below the system.

The whole is completed by a control block, run by a timeswitch which starts a density reading according to the following programme :

start-off means for making the microbial culture circulate in the system ;

at the end of a periode, alternate movement of the piston in the test tube in order to clean the walls, and the stopping of the piston in raised position ;

reading of optical density to serve as calibration measurement ;

lowering of piston bringing about a filling up of the test tube ;

stopping of the means for making the microbial culture circulate in the system ;

after a period of rest corresponding to the decantation of large particles, and to the rising of any bubbles, reading of optical density of the culture.

DESCRIPTION OF THE PREFERRED EMBODIMENT

Figure 1:
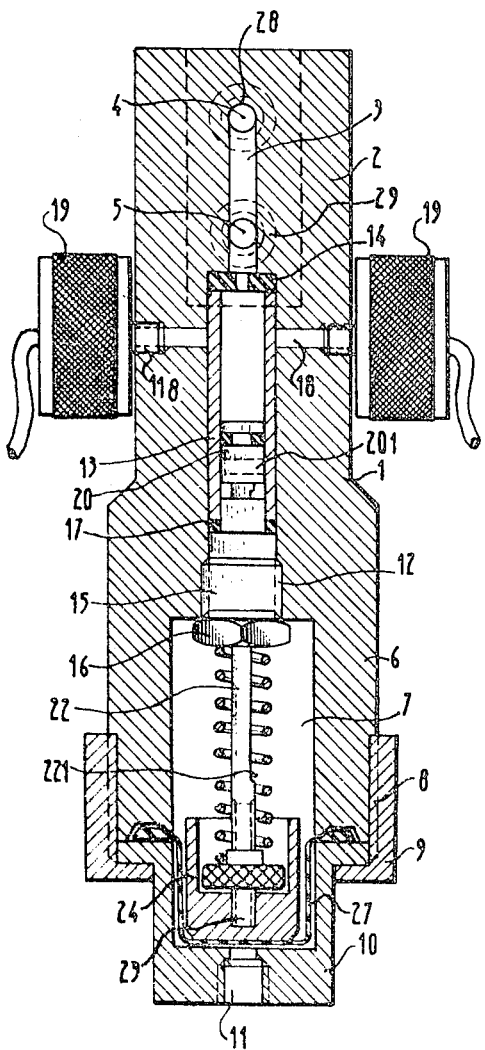
FIG. 1 shows in vertical section a sampling apparatus according to the invention, the piston being in the lowered position.
Figure 2:
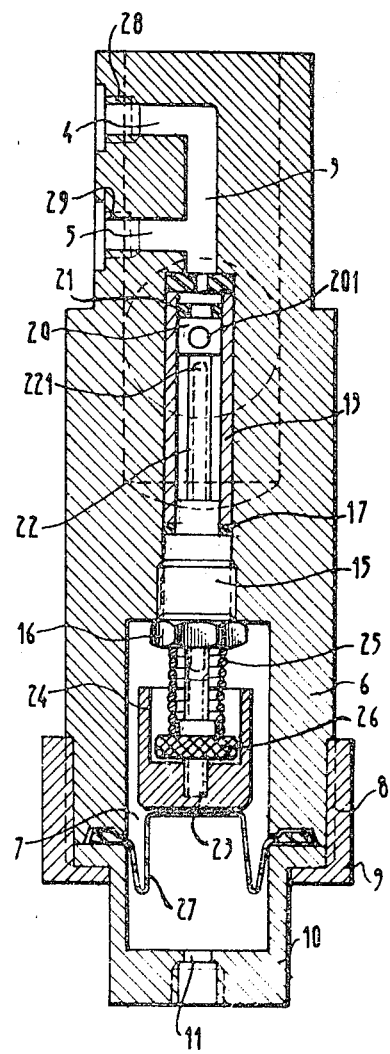
FIG. 2 shows in another vertical section according to another vertical plane, the piston being in raised position.

Referring first to FIGS. 1 and 2, a sampling apparatus according to the invention has a main body 1, having the general shape of a cylindrical sleeve in metal for example; the upper part 2 of this sleeve is provided with a bore 3, along the axis of the said sleeve, in relation with two radial bores 4 and 5, the said radial bores being provided, at their outlets, with threads 28 and 29 for the sealed joining on of lateral nozzles. The lower part 6 of the said main body 1 has an inner chamber 7 and an outer thread 8; on the thread 8 is screwed a ring 9 bearing against the said lower part in sealed manner by a base 10 provided with an axial screwed bore 11. Between the lower and upper parts described above, the main body comprises a middle part provided with an axial bore with a thread 12 on its lower portion; this bore contains a tube made of transparent material 13, calibrated and ground flat at each of its ends; this tube is preferably made of PYREX; the said tube is pressed against a seal 14 which is pierced at its center, by a cylindrical part 15 screwed on its outside and provided with a maiden nut 16 which is applied against the said tube by means of a toric seal 17; the said part 15 is provided with an axial bore. More particularly on FIG. 1, between the middle portion and the upper portion of the main body, a radial bore 18 can be seen traversing the said main body from side-to-side and having at each of its ends threads 118 on which are screwed the elements 19 of a densitometric apparatus; one of these elements 19 is a light source, the other a detector or photoelectric receiver. It can be noticed that the two elements 19, which are non-sterilizable, are easily removable in order to allow for the separate sterilization of the main body and of the whole of the sampling apparatus.

On FIG. 2, besides the parts already described, there can be seen more especially a piston 20 movable inside the tube 13, the said piston having a toric seal 21 for performing the sealing of the piston in the tube and for scraping the inside wall of the said tube 13; the piston 20 is bored by a cylindrical diametrical port 201 to allow the passing of the light beam of the densitometric apparatus 19 when the piston is in raised position. The advantage of this arrangement will be explained later.

The piston is moved by a rod 22 sliding in the bore of the cylindrical part 15; means comprising a flat 221 on the rod 22 and a corresponding section of the axial bore of the cylindrical part 15, prevent the rotation of the piston about its axis; the lower end of the rod 22 is placed in a bore 23 of a protection hood 24; in addition, the rod 22 is pushed downwards by a spring 25 bearing against the maiden nut 16 and a knurled part 26, placed in the hood 24 and serving to regulate the tension of the spring 25; the hood 24 rests on a flexible membrane 27 separating in a pressure-tight manner the inner chamber 7 of the bore 11.

Figure 3:
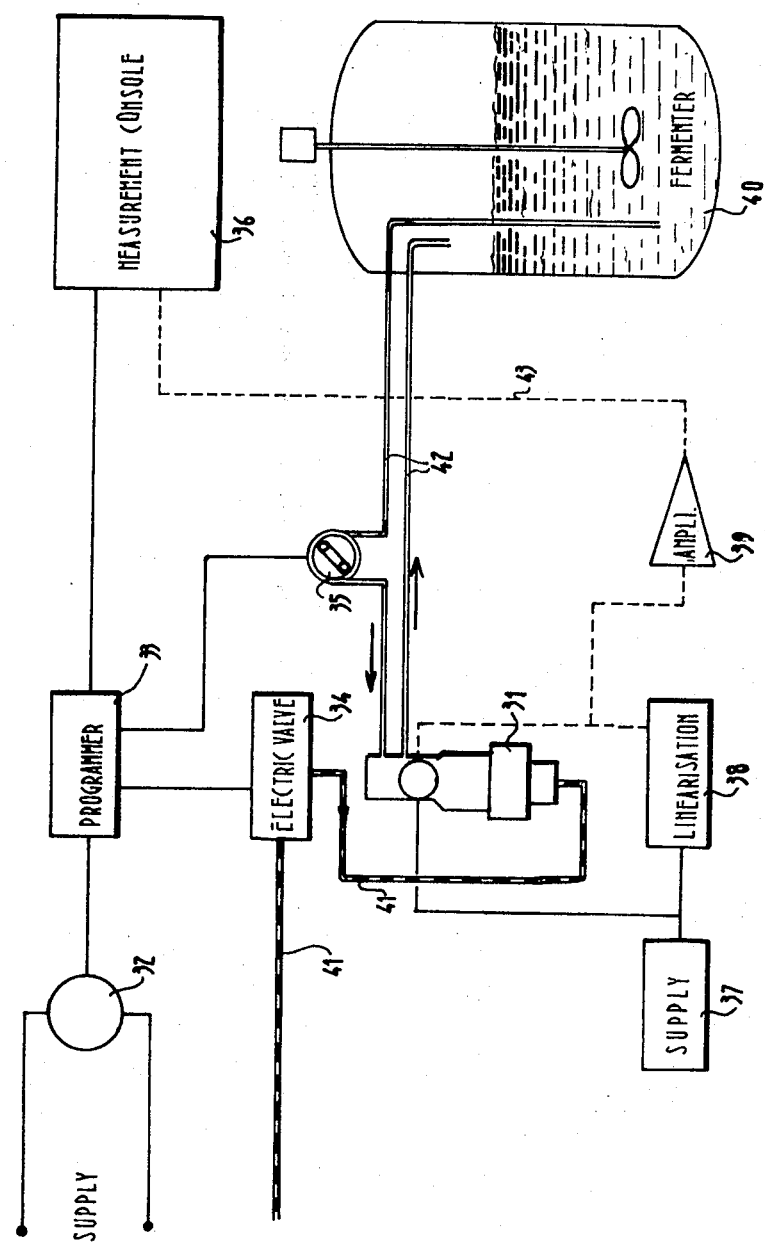
FIG. 3 shows schematically the same and its control block.

In FIG. 3, a sampling apparatus 31, of the type described in connection with FIGS. 1 and 2, adapted for making densitometric measurements of a culture growth contained in a fermentation vat or fermenter 40, is shown with the components of its control-block, consisting of a time-switch 32, a programmer 33 governed by the time-switch 32 to control an electric valve 34, a pump 35, and a measurement console 36, other components being a supply block 37, a linearization block 38 and an amplifier 39.

There is likewise shown in FIG. 3 a compressed air duct 41 linking, by means of the electric valve 34, a source of compressed air (not shown) to the base of the sampling apparatus 31; this duct 41 ends in the axial screwed bore 11 (FIGS. 1 and 2); in FIG. 3, is also seen a sampling duct 42 linking, by means of the pump 35, the apparatus 31 to the fermentation vat or fermenter 40, and a line 43 conducting the measuring signal of the apparatus 31 to the measurement console 36, through the amplifier 39, the linearization block 38 being mounted in shunt with this line 43 between the apparatus 31 and the amplifier 39. On the apparatus 31, the two branches of the pipe 42 end in the radial bores 4 and 5 (FIG. 1 and 2) and are fixed on them in a sealed and aseptic manner by means of threads 28 and 29.

Figure 4:
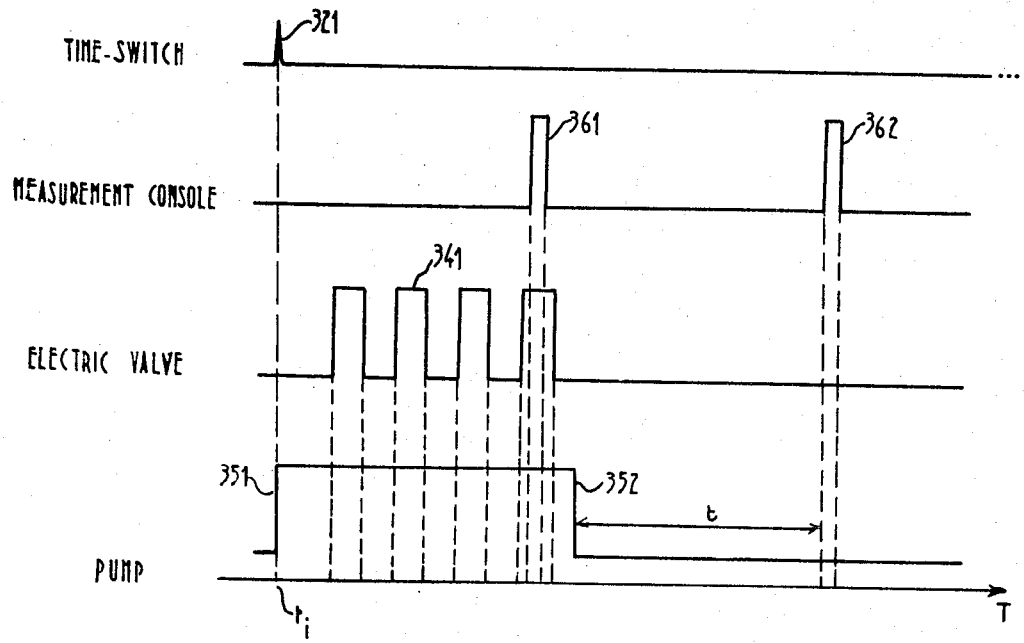
FIG. 4 is a diagrammatic example of the development of the measuring programme of an apparatus according to the invention.

In FIG. 4, a diagram of the development of a working programme indicates the transitions from off to on or from on to off of the assemblies indicated in FIG. 3. The time-switch 32 periodically triggers, by means of a pulse 321 (FIG. 4), the working of the programmer 33; the development of its programme will be better understood by referring to FIGS. 1, 2, 3 and 4 together; it triggers successively:

the starting 351 of the pump 35 at the initial time $t_i$; this pump, placed on the pipe 42, forces into circulation some culture sampled in the fermenter 40;

after a certain circulation time, the alternate opening and closing of the electric valve 34. While the electric valve is open, the pressure of compressed air is established under the membrane 27 of the apparatus 31, the piston 20 is pushed upwards and the culture medium which is in the tube 13 above the piston 20 is forced into the pipe 42; when the electric valve is closed, the compressed air under the membrane 27 is pushed back into the atmosphere, the spring 25 moves the piston 20 downwards and some fresh culture medium is drawn into the tube 13; the alternate opening and closing of the electric valve causes therefore an alternate vertical movement of the piston with a rest period in raised position and a rest period in lowered position.

The connection 361 of the measurement console 36 to the output of the amplifier 39, when the piston is in raised position for the fourth time. The measurement console then records as is said above, a calibration value independent of the culture, since the port 201 is filled with air. After, for example, the fourth drawing in, the piston being returned into lowered position, it is deemed that the culture medium in the tube 13 is representative of that found in the fermenter 40 ; in addition, the interior wall of the tube 13 has been cleaned of all deposits by the rubbing of the toric seal 21.

The stopping of the pump 352, immediately after the piston has returned into lowered position and has drawn in a sample of bacterial culture.

Once more, the connection 362 between the measurement console 36 and the amplifier 39 after there has elapsed, since the stopping of the pump, a time t sufficient for the decantation of large particles and the elimination of gas bubbles out of the path of the light beam. The linearisation apparatus, connected in shunt, as has already been said, between the apparatus 31 and the amplifier 39, transforms the optical density measurement provided by the system 19 into units of concentration of bacterial cultures.

Figure 5:
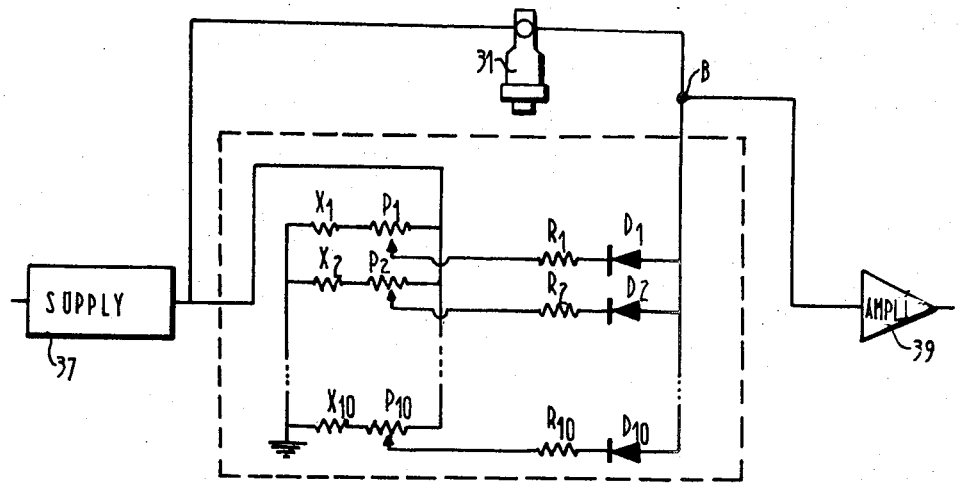
FIG. 5 is a circuit diagram of a linearizer preferably used in a measurement assembly according to the invention.

In FIG. 5, is seen schematically an example of lineariser particularly well suited to the linearisation of a very rapidly growing function as is almost always the case of an output signal in optical density measurement. In this circuit diagram, there are seen potentiometers such as $P_1, P_2 \ldots P_{10}$ supplied in parallel by the supply 37 and, in series with each of these potentiometers, a safety resistance $X_1, X_2 \ldots X_{10}$ ; each slider of the potentiometers $P_1, P_2 \ldots P_{10}$, is linked to the output terminal B of the lineariser through a diode $D_1, D_2 \ldots D_{10}$ and through a series resistance $R_1, R_2 \ldots R_{10}$.

The adjustment of a potentiometer such as $P_1$ controls the potential $P_1$ of its slider ; when the potential at B is less than $P_1$, the diode $D_1$ is non-conductive ; when all the diodes $D_1, D_2 \ldots D_{10}$, are non-conductive, the impedance of the lineariser is infinite and it is not in circuit ; when the potential at B reaches the lowest value of $P_1, P_2 \ldots P_{10}$, the corresponding diode $D_1, D_2 \ldots D_{10}$ becomes conductive and the impedance of the lineariser becomes equal to that of the corresponding circuit. When the potential at B continues to grow, the impedance of the input of the lineariser gets smaller each time that it reaches a value $P_1, P_2 \ldots P_{10}$ ; the sensitivity of the amplifier diminishes by the same amount.

An appropriate adjustment of the potentiometers $P_1, P_2 \ldots P_{10}$ allows the input signal of the amplifier 39 to be very appreciably proportional to the concentration of cells in the culture.

One of the advantages of sampling apparatus according to the invention is to provide a simple and efficient solution to the problem of gas bubbles which falsify the optical density measurements in the culture media ; the answer lies in a delay governed by the programmer between the last drawing in and the moment when the measurement console is connected. During this time, any bubbles present in the sample would have the time to rise towards the top of the tube, out of the measuring zone. Another advantage, already noted, is that of cleaning, by repeated movements of the piston, the internal wall of the tube 13 by scraping off the deposits which always by their very nature accompany heterogeneous biological media.

Another advantage of such an apparatus is that of being easily detached from its control block, with a view to its sterilization by autoclaving, by unscrewing the lateral nozzles screwed in the radial bores 4 and 5, the elements 19 of the densitometric apparatus and the air duct 41. the piston as compared with a piston in translucent material, lies in the fact that the wall of the translucent piston becomes opaque during working whilst the port, defined by an absence of wall in the path of the light beam, maintains an excellent reproducibility during working for the calibration measurement. Experience has also shown, that if for example the port 201 is a translucent rod, unstable films can form and stick momentarily to the ends of this rod and falsify the reading of the calibration measurement.

The advantage resulting from the use of a lineariser is that of obtaining a precision of measurement that is practically constant over a very wide range of optical densities, in spite of the fact that this latter is far from being a linear function of the concentration.

An advantage of a lineariser having potentiometers $P_1, P_2 \ldots P_{10}$ mounted in parallel, in comparison with a lineariser similar in principle, but in which the potentiometers $P_1, P_2 \ldots P_{10}$ are mounted in series, is to allow a better uncoupling of the adjustment of the potential of the sliders ; on the other hand the separateness of the safety resistance $X_1, X_2 \ldots X_{10}$ allows a very rapid lessening of the impedance at high voltages to be obtained, therefore linearising curves of very rapid growth, which is the case in the type of measurements under discussion.

We claim:

1. A turbidimetric apparatus for optically measuring the density of a microbial culture sample comprising in combination:
    a transparent measurement chamber;
    a piston mounted for reciprocation in said chamber;
    pneumatic means for moving said piston in one direction;
    mechanical means for moving said piston in the opposite direction;
    a flexible membrane separating said pneumatic means from said mechanical means whereby there is provided a safe circulation of the potentially dangerous microbial culture in a closed circuit in a total biological isolation;
    radiation sensitive means to simultaneously read the degree of advancement of the biological fermentation process of the fluid and means of simultaneously cleaning the walls for said chamber.

2. A turbidimetric apparatus as claimed in claim 1, said piston being provided with a toric seal; and a
    variable fluid pressure source connected with said pneumatic means, whereby the inner walls of said chamber are cleaned.

3. A turbidimetric apparatus as claimed in claim 1, wherein said radiation sensitive means comprises;
    a light source; and
    a photocell.

4. Apparatus according to claim 3 wherein said movable piston is provided with a diametrically crossing port allowing the passage of the beam from said light source to said photocell when the piston has been pneumatically driven, whereby a calibration density measurement is obtained.

5. Apparatus according to claim 3 wherein said light source and said photocell are detachable whereby said apparatus may be easily sterilized.

6. Combined sampling and measuring apparatus for measuring the optical density of a microbial culture circulating in a tubular circuit comprising:
- a microbial fermenter
- a pump for said fermenter;
- a transparent cylindrical measurement chamber shunt connected to said tubular circuit;
- means for sampling said microbial culture inside said chamber, including a light source, a photocell and piston in said chamber and mechanical and pneumatic means respectively for reciprocating said piston mechanically in one direction and pneumatically in the opposite direction;
- a flexible membrane separating said mechanical and said pneumatic means from each other;
- a variable fluid pressure source connected with said pneumatic means;
- said piston being provided with a toric seal, whereby said piston performs the cleaning of the walls of said chamber.

* * * * *